United States Patent
Hamel et al.

(10) Patent No.: US 6,714,763 B2
(45) Date of Patent: Mar. 30, 2004

(54) MICROPOWER DIFFERENTIAL SENSOR MEASUREMENT

(75) Inventors: Michael John Hamel, Williston, VT (US); Christopher P. Townsend, Shelburne, VT (US); Steven W. Arms, Williston, VT (US)

(73) Assignee: Microstrain, Inc, Williston, VT (US)

( * ) Notice: Subject to any disclaimer, the term of this patent is extended or adjusted under 35 U.S.C. 154(b) by 0 days.

(21) Appl. No.: 10/215,752

(22) Filed: Aug. 9, 2002

(65) Prior Publication Data

US 2002/0190785 A1 Dec. 19, 2002

Related U.S. Application Data

(62) Division of application No. 09/768,858, filed on Jan. 24, 2001, now Pat. No. 6,433,629.
(60) Provisional application No. 60/177,364, filed on Jan. 24, 2000.

(51) Int. Cl.[7] .................................................. H04B 5/00
(52) U.S. Cl. ........................ 455/41; 455/127.1; 455/572; 340/827
(58) Field of Search ................................. 455/41.1, 41.2, 455/41.3, 414.1, 67.11, 67.15, 550.1, 554.1, 554.2, 555, 572, 115.1, 127.1; 340/505, 539.1, 448, 572.1, 636.2, 825, 10.1, 10.33, 10.34, 10.4; 342/42, 44.51

(56) References Cited

U.S. PATENT DOCUMENTS

| 5,247,449 | A | * | 9/1993 | Yoshida | 700/136 |
| 5,848,062 | A | * | 12/1998 | Ohno | 370/311 |
| 6,087,930 | A | * | 7/2000 | Kulka et al. | 340/447 |
| 6,181,253 | B1 | * | 1/2001 | Eschenbach et al. | 340/825.37 |
| 6,353,406 | B1 | * | 3/2002 | Lanzl et al. | 342/118 |

* cited by examiner

*Primary Examiner*—Edward F. Urban
*Assistant Examiner*—Thuan T. Nguyen
(74) *Attorney, Agent, or Firm*—James Marc Leas

(57) ABSTRACT

A sensing device includes a Wheatstone bridge and a source of a stimulation configured to apply the stimulation across two electrodes of the Wheatstone bridge. The device also includes a timing sensitive circuit configured to detect timing of a signal appearing across one of the other electrodes of the bridge as a result of the stimulation being applied. The timing provides a way to read the sensor. The device can be powered remotely and data so read can be transmitted using the remote power. The timing sensitive circuit includes a comparator. The comparator provides a high logic signal for a time related to the reactance of one leg of the Wheatstone bridge, and that provides a reading of a differential sensor having elements in each leg of the bridge.

16 Claims, 7 Drawing Sheets

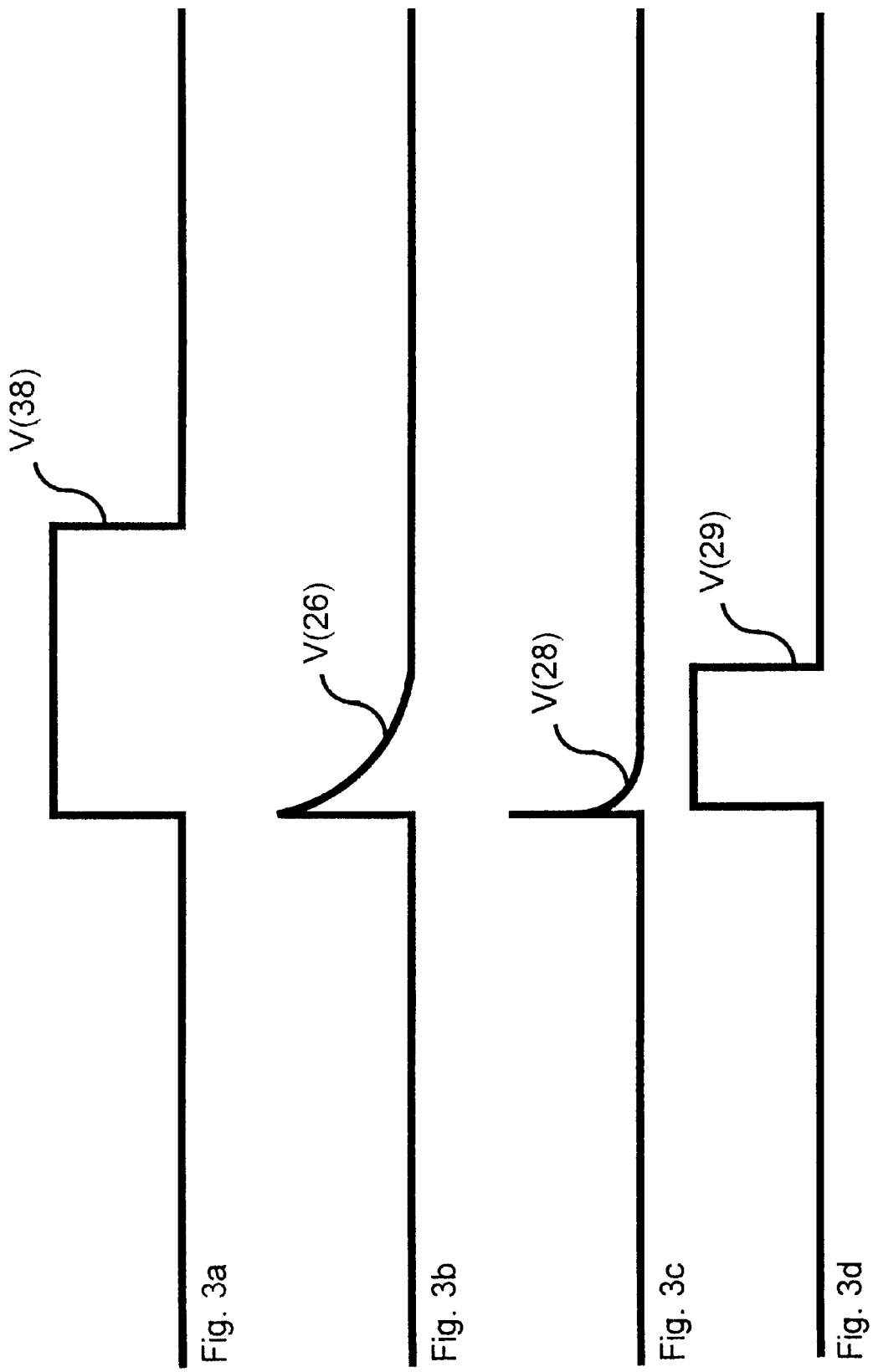

MICROPOWER DIFFERENTIAL SENSOR MEASUREMENT

This is a division of U.S. application Ser. No. 09/768,858, filed Jan. 24, 2001, now U.S. Pat. No. 6,433,629, which claims the benefit of U.S. provisional application No. 60/177,364, filed Jan. 24, 2000.

FIELD OF THE INVENTION

This invention generally relates to sensors. More particularly, it relates to low power differential sensors. Even more particularly, it relates to a device for low power sensing and transmitting data.

BACKGROUND OF THE INVENTION

Smart sensors are being developed for use in roads, bridges, dams, buildings, towers, and vehicles. The sensors may provide many types of information, including displacement, strain, speed, acceleration, temperature, pressure, and force. For remote sensing one challenge has been to provide sensors that consume very low power for reading the sensor and transmitting the data.

Available sensors have required continuous energizing either for operation or for data transmission, and have required substantial power supplies. For example, a paper, "Multichannel Strain Gauge Telemetry for Orthopaedic Implants," by G. Bergmann, et al., J. Biomechanics Vol. 21 no. 2 pp 169–176, 1988, describes remote powering of a Wheatstone bridge with active strain gauges that require continuous power. A paper, "Remotely powered, multichannel, microprocessor based telemetry systems for smart implantable devices and smart structures, by Chrisopher Townsend, et al, describes an implantable sensor telemetry system that uses low power microprocessors integrated circuits, Wheatstone bridge signal conditioning, and a remote powering system. The Wheatstone bridge has advantage in providing temperature compensation. However, the bridge circuit also requires a continuous voltage and flow of current, so substantial energy is eventually used. Conventional Wheatstone bridge signal conditioners, such as Townsend's, require instrumentation amplifiers and analog to digital converters which increase the power demand, size, and complexity of these systems.

International patent WO 87/00951 shows an inductive sensor used as the feedback element in an astable multivibrator. This circuit requires a non-differential sensor, which results in poor temperature stability. In addition, the astable multivibrator requires continuous power to operate.

A book, "Capacitive sensors design and Applications," by L. K. Baxter, IEEE Press, 1997, shows a microcontroller providing a train of pulses or a microcontroller providing a single interrogation pulse to excite a capacitive limit switch. However, the circuit described by Baxter does not provide a way to measure more than the two positions of the capacitor and does not compensate for changes in temperature.

A paper, "Microminiature, high resoluton, linear displacement sensor for peak strain detection in smart structures," by Steven W. Arms, et al., proceedings of the SPIE $5^{th}$ Annual International Conference on Smart Structures and Materials, San Diego, Calif., Mar. 1–5, 1998, describes a differential method of capturing the peak displacement of a member attached to a structure without requiring any power. The paper did not describe micropower methods for remote interrogation.

Thus, a better system for acquiring and transmitting data is needed that uses less energy and that provides temperature compensation, and this solution is provided by the following invention.

SUMMARY OF THE INVENTION

It is therefore an object of the present invention to provide a circuit for collecting sense data that avoids a continuous flow of current and use of power;

It is a further object of the present invention to lower power requirements for a sensor by providing a circuit in which a single signal, such as a single pulse, is sufficient for performing a measurement;

It is a further object of the present invention to combine a low power circuit for reading a sensor with a remotely powered interrogation system;

It is a further object of the present invention to provide a differential sensor in a Wheatstone bridge configuration with a pulse signal to provide a low power data sensing circuit;

It is a feature of the present invention that the Wheatstone bridge provides for a temperature compensated reading of the differential sensor;

It is a further feature of the present invention that the remotely powered interrogation system provides power for running the sensor; and It is an advantage of the present invention that the circuit for reading a sensor uses very low power.

These and other objects, features, and advantages of the invention are accomplished by a electronic circuit comprising a first electrode, a second electrode, a third electrode and a fourth electrode. The circuit also includes a differential sensor comprising a first variable element connected to a second variable element at the first electrode. The first variable element is also connected to the second electrode. The second variable element is also connected to the third electrode. A fixed device is connected between the second electrode and the fourth electrode. A source of a stimulation is connected to apply a stimulation across the first and the fourth electrodes. A timing sensitive circuit is configured to measure timing of a signal appearing at the second electrode that arises from the stimulation applied across the first and fourth electrodes.

Another aspect of the invention is accomplished by a method of reading a sensor comprising several steps. The first step is providing a differential sensor having a first variable element and a second variable element. Next, providing a comparator. Then providing a signal to the first variable element wherein the sensor produces an output depending on magnitude of the first variable element. Finally, using the comparator for providing a signal that is a measure of that magnitude.

Another aspect of the invention is accomplished by a method of using an electronic circuit, comprising the step of providing a circuit comprising a sensor, a circuit for reading the sensor, and a circuit for transmitting data. The next step is wirelessly providing power to the circuit from a remote source of power. Then, sensing a change in an environmental condition with the sensor. Then, reading the sensor with the circuit for reading the sensor, wherein only a single stimulation signal to the sensor is needed to read the sensor. Then, providing the reading to a transmitting circuit and transmitting the data with the transmitting circuit.

BRIEF DESCRIPTION OF THE DRAWINGS

The foregoing and other objects, features, and advantages of the invention will be apparent from the following detailed description of the invention, as illustrated in the accompanying drawings, in which:

FIG. 3a is a timing trace of a pulse input to the Wheatstone bridge sensor identical to FIG. 2a;

FIG. 3b is a timing trace of the pulse of FIG. 3a at an electrode along a first leg of an unbalanced Wheatstone bridge having a larger capacitor than the other leg;

FIG. 3c is a timing trace of the pulse of FIG. 3a at an electrode along a second leg of the unbalanced Wheatstone bridge having a smaller capacitor;

FIG. 3d is a timing trace of the output of a comparator connected to the electrodes along a first and a second leg of a Wheatstone bridge when the bridge is unbalanced;

DETAILED DESCRIPTION OF THE INVENTION

The present inventors recognized that substantially less energy could be used by a sensor configured as part of a Wheatstone bridge if a single pulse signal was sufficient to provide a reading of the sensor. In that case, power in the Wheatstone bridge is only used during the time of the pulse. They then developed a circuit that could read the sensor with such a single pulse. The circuit takes advantage of the timing difference as the signal travels in parallel along each leg of the bridge. This timing difference provides a measure of the imbalance in the bridge and gives a reading of data collected by the sensor. The timing difference arises because of the difference in capacitance, inductance, or resistance on each side of the bridge which provides different RC or RL time constants on each side. The timing difference is captured by a comparator, and used by a micro controller to measure the magnitude of bridge unbalance and magnitude of change in conditions sensed by the sensor. If one comparator is used, change in one direction can be measured, and this approach is practical for many applications. Change in either direction can be measured if two comparators are used in the circuit, and the direction of the change in condition can also be determined with this configuration. The inventors also recognized that power required by this system was so low that all the power needed for the signal, to run the sensor and electronics, and for data transmission could now be provided by a wireless remote power supply. This has the advantages of allowing temporary, remote powering and allows for reading difficult to access and embedded sensors.

Figure 1:
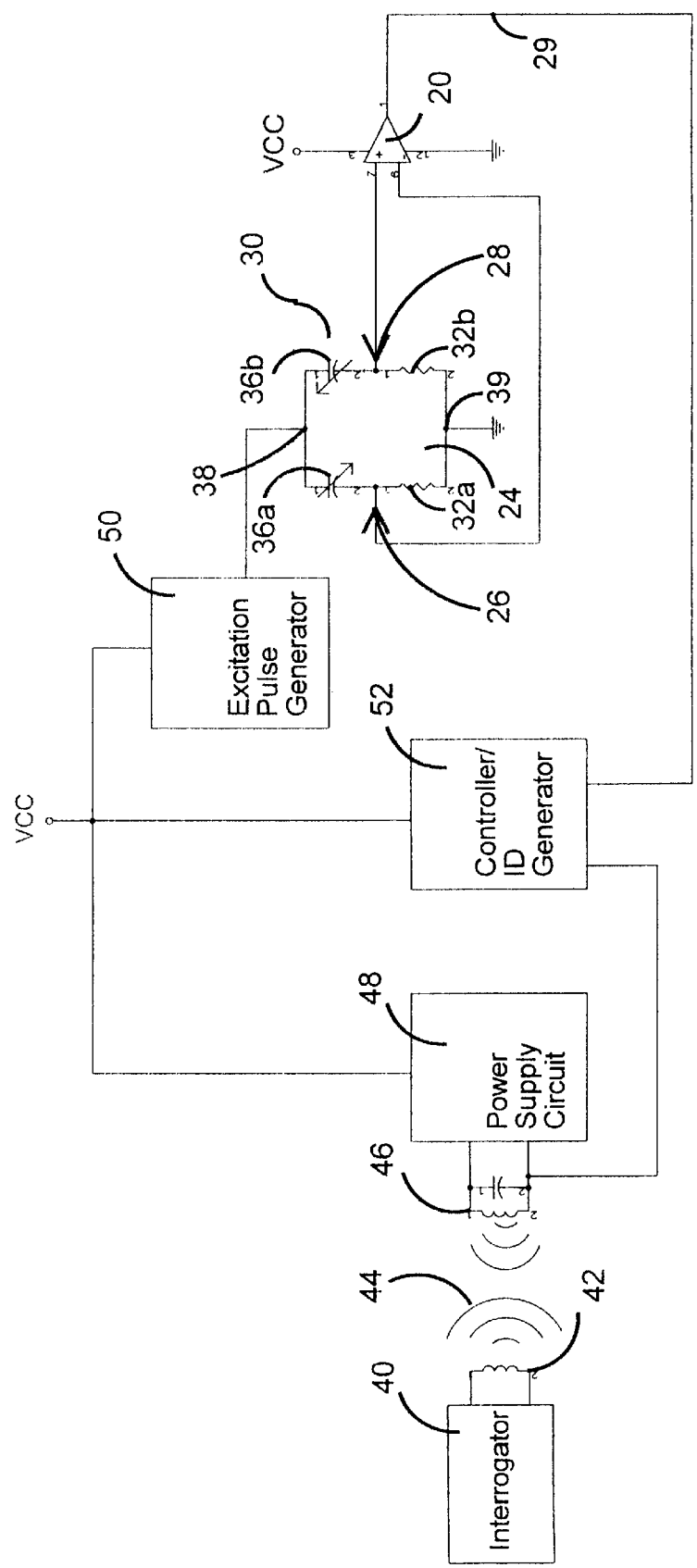
FIG. 1 is a block diagram of a sensing unit comprising a Wheatstone bridge, a comparator, interrogator, and remotely powered power supply of the present invention.

Micropower voltage comparator 20 is used to measure the balance of Wheatstone bridge 24 across electrodes 26, 28, as shown in FIG. 1. Comparator 20 has output 29 that switches from 0 to 1 if signal provided to the +input is higher than signal provided to the −input. By contrast output 29 of comparator 20 stays at 0 or switches to 0 if signal at the +input is equal to or less than signal at the −input.

Practical comparators, as provided by manufacturers, vary in their switching voltage. This variation in switching voltage is called offset. The present invention is more workable with practical comparators that have such offset. In that case output 29 of comparator 20 switches to a high logic level 1 when the voltage on the +input rises more than the offset value above the voltage on the −input. The comparator switches back to 0 when the voltage on the +input falls below the offset value above the voltage on the −input. This offset eliminates switching of comparator output 29 caused by noise at its inputs. Additional resistors can also be used to adjust the input bias on the comparator or to add hysteresis to the comparator's response, as is well known in the art.

Wheatstone bridge 24 comprises differential sensor 30 and two identical bridge completion resistors 32a, 32b. Differential sensor 30 includes variable capacitors 36a, 36b with center electrode 38 there between at the top of Wheatstone bridge 24. Wheatstone bridge also includes ground electrode 39 between completion resistors 32a, 32b.

Interrogator 40 generates an alternating current in excitation coil 42 to produce magnetic field 44. Field 44 induces an alternating current in receive circuit 46, which is rectified and filtered in power supply circuit 48. Excitation pulse generator 50 uses power from power supply 48 to generate a pulse sometime after Vcc voltage from power supply 48 has stabilized. The excitation pulse is then applied to center electrode 38 at the top of Wheatstone bridge 24. Excitation pulse generator 50 may be controlled by controller/ID generator 52. The signal applied to center electrode 38 can also be a step function or any other kind of signal. A pulse having a sharp leading edge is preferred since the energy used by the sensor is least and the sharp leading edge provides a timing reference from which to measure the RC time constant.

Figure 2A:
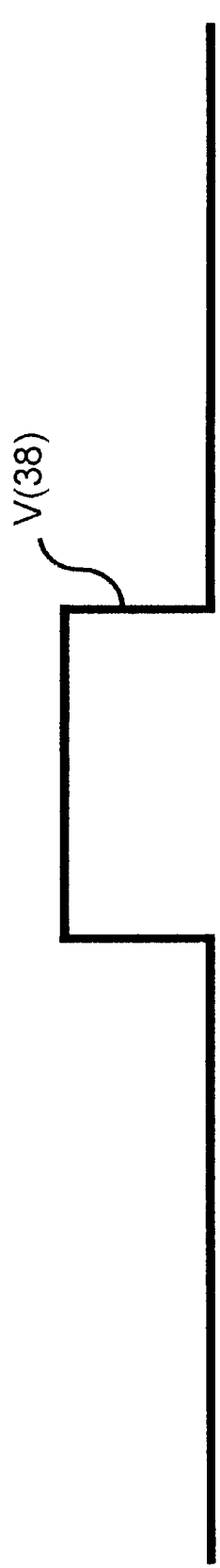
FIG. 2a is a timing trace of a pulse input to the Wheatstone bridge sensor.
Figure 2B:
FIGS. 2b and 2c are timing traces of the pulse of FIG. 2a at electrodes along a first and a second leg of the Wheatstone bridge when the bridge is balanced.
Figure 2C:
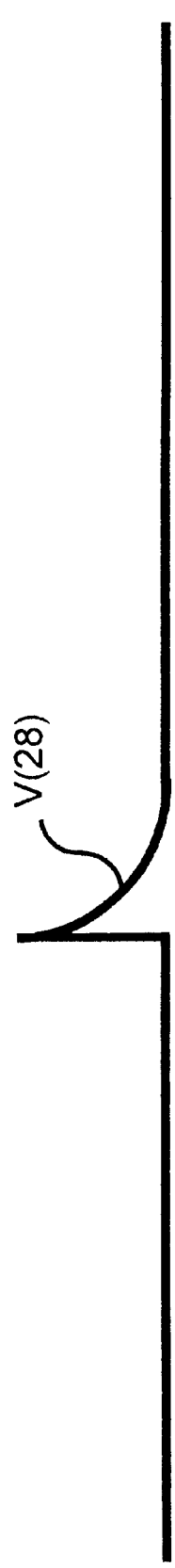
Figure 2D:
FIG. 2d is a timing trace of the output of a comparator connected to the electrodes along a first and a second leg of a Wheatstone bridge when the bridge is balanced.

Wheatstone bridge 24 is balanced when variable capacitors 36a, 36b are equal. An excitation pulse is applied between electrode 38 and ground electrode 39. In this case, voltage measured between electrode 26 and ground 39 should be identical to voltage measured between electrode 28 and ground at all times since the RC is the same on both sides of the bridge and capacitor charging curves on each side of bridge 24 are therefore identical. Although exponentially varying voltages will appear at electrodes 26, 28 and on + and −inputs of comparator 20, as shown in FIGS. 2a, 2b, the voltages at electrodes 26, 28 and at +input and −input to comparator 20 should be identical (within the offset tolerance) at every moment in time. With signal on each side of comparator 20 always identical, output 29 of comparator 20 remains fixed at 0 for a balanced Wheatstone bridge.

But Wheatstone bridge 24 is unbalanced when a change in environmental conditions causes a change in sensor 30, and this causes a change in variable capacitors 36a, 36b, making them unequal. For example capacitive, differential sensor 30, shown in FIG. 1, could be a well known type of pressure sensor which typically has a conductive diaphragm with conductive plates on each side of the diaphragm. A change in pressure across the diaphragm will move the diaphragm toward one plate and away from the other plate, increasing the capacitance between the diaphragm and the first plate and decreasing the capacitance between the diaphragm and the second plate.

Another example of capacitive, differential sensor 30 is a linear displacement sensor in which two lower plates are connected to electrodes 26 and 28 of bridge 24 as shown in FIG. 1. A single common top plate is connected to top electrode 38, and this single top plate extends partly over both lower plates. Movement of the top plate relative to the other two causes an increase in overlap area for one plate and a decrease in overlap area for the other plate, increasing one capacitance and decreasing the other.

When a signal is applied to electrode 38 for the unbalanced case, voltage measured between electrode 26 and ground will differ from voltage measured between electrode 28 and ground as each capacitor charges at a different rate, as shown in FIGS. 3b, 3c. This difference in voltage arises from the different RC delays for the two different capacitors, 36a, 36b. Voltages appearing on + and −inputs of comparator 20 will no longer be identical during time for capacitor charging, and output 29 of comparator 20 can shift from 0 to 1. The side of bridge 24 with the larger capacitor will have the longest RC delay, so voltage across its resistor will be higher than voltage on the side with the smaller capacitor. If the electrode on the side with the larger capacitor is connected to the +side of comparator 20, output 29 of comparator 20 will shift from 0 to 1. If connected to the minus side, output 29 of comparator 20 will remain at 0.

For example, FIG. 3a shows square wave pulse V(38) applied between electrode 38 and ground electrode 39. The rising edge of square wave pulse has a very high frequency, so on the leading edge of square wave pulse V(38), each capacitor has a very low impedance at first, so no voltage appears across capacitor 36a or capacitor 36b and the voltage applied between electrode 38 and ground appears across each supporting resistor, 32a, 32b. Therefore, the full voltage of square wave pulse V(38) applied between electrode 38 and ground electrode 39 initially appears across resistor 32a and resistor 32b at electrodes 26 and 28. Voltage between electrode 26 and ground (V26) is shown in FIG. 3b starting initially at applied voltage Vcc and then decaying as capacitor 36a charges up with larger time constant $RC_a$. As capacitor 36a fully charges voltage at electrode 26 falls from Vcc to zero. Similarly voltage between electrode 28 and ground V(28) is shown in FIG. 3c starting initially at applied voltage Vcc and then decaying as capacitor 36b charges up with smaller time constant $RC_b$. Since capacitor 36a is larger than capacitor 36b in this example, time for decay of V(26) is longer than time for decay of V(28). Thus, at any moment in time, voltage at electrode 26 is higher than voltage at electrode 28. This voltage difference causes a shift in comparator 20 tied between electrodes 26 and 28 if the +input of comparator 20 is tied to electrode 26—the electrode on the leg of Wheatstone bridge 24 with the larger capacitor—and the −input of comparator 20 is connected to electrode 28—the electrode on the leg of Wheatstone bridge 24 with the smaller capacitor.

Controller/ID generator 52 can measure the time ΔT that output 29 of comparator 20 has a voltage V(29) is equal to 1 (see FIG. 3d), which provides a measure of the unbalance in Wheatstone bridge 24 and a measure of magnitude of the sensor data.

Controller/ID generator 52 then appends this sensor information time duration ΔT to an ID code which is transmitted back to interrogator 40 using energy from power supply 48 that is received by receive coil 46 via magnetic field 44 from coil 42 of interrogator 40.

Variable capacitors 36a, 36b can be at the top of Wheatstone bridge 24 as shown in FIG. 1. Alternatively, as is well known to one skilled in the art, positions in Wheatstone bridge 24 can be reversed with variable capacitors 36a, 36b located at the bottom of the Wheatstone bridge, while fixed resistors 32, 34 are located at the top. In this case, center electrode 38 would be between fixed resistors 32, 34 and ground connection 39 would be between variable capacitors 36a, 36b.

Figure 4:
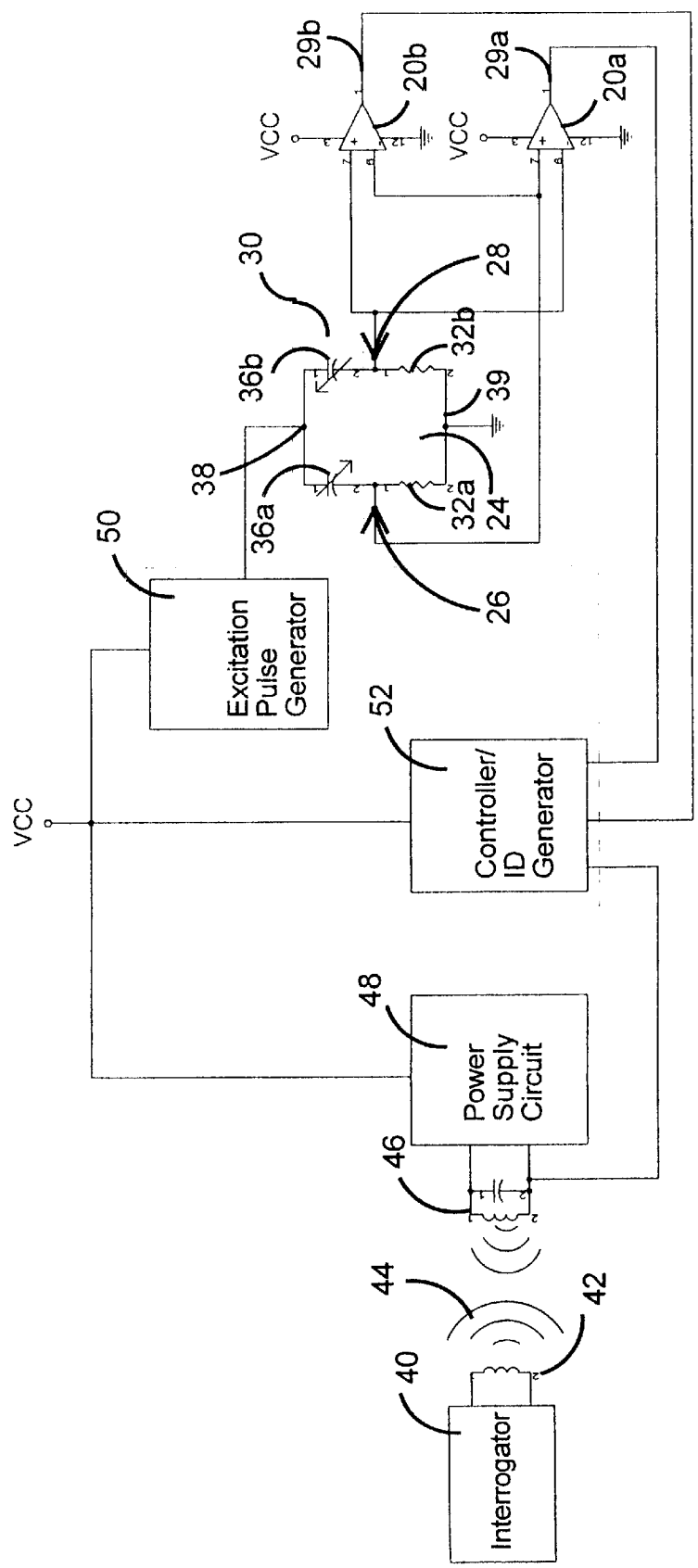
FIG. 4 is a block diagram of a sensing unit comprising a Wheatstone bridge, a pair of comparators, an interrogator, and remotely powered power supply of a second embodiment of the present invention.

The embodiment of FIG. 1 works well when the sensor is providing a reading exclusively in one direction, for example, in measuring certain peak strains that go exclusively in one direction. For measuring unbalance in either direction, two micropower voltage comparators 20a, 20b can be included in the circuit, as shown in FIG. 4. In this case, depending on the direction of the change in condition and which side of bridge 24 has a larger capacitor, output 29a of comparator 20a or output 29b of comparator 20b will maintain its high logic state 1 for a time interval ΔT equal to the time for decay of voltage between electrode 26 or electrode 28 and ground.

Controller/ID generator 52 then reads that time duration from the width of output signal 29a or 29b from whichever comparator 20a or 20b went high. Recognizing which of comparators 20a or 20b went high tells controller 52 the direction of bridge unbalance and the direction of change in environmental condition. Thus, two comparators allow determining which leg of bridge 24 has the larger capacitor and how big that capacitor is, giving both the direction and magnitude of the change in environmental condition.

Figure 5:
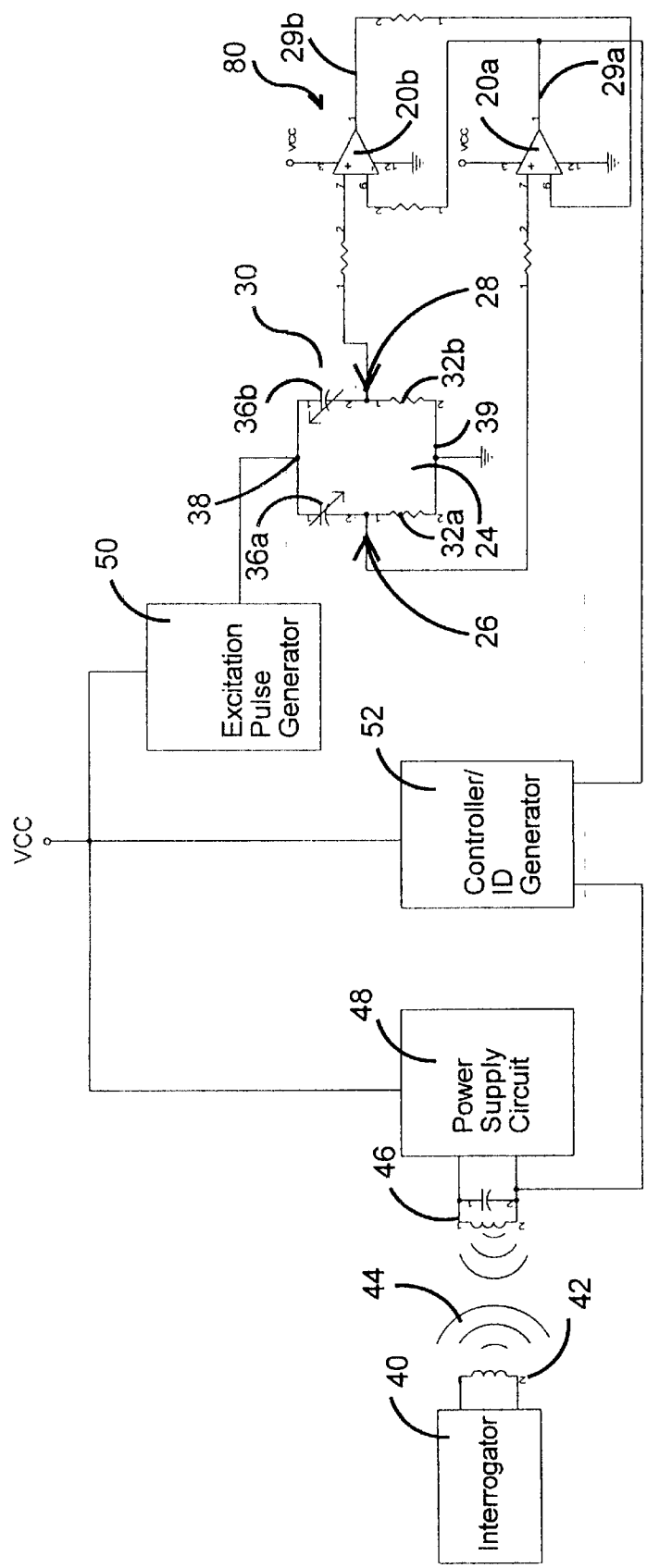
FIG. 5 is a block diagram of a sensing unit comprising a Wheatstone bridge, a pair of comparators comprising a set/reset latch, an interrogator, and remotely powered power supply of a third embodiment of the present invention.

In another embodiment, comparators 20a, 20b are wired to provide set/reset latch circuit 80, as shown in FIG. 5. This set/reset latch is useful, for example, in a case where change is exclusively in one direction and an extended time is needed for controller/ID generator 52 to perform a reading. The latch provides indication of when the capacitor 36a has a larger capacitance value than capacitor 36b. Electrode 26 is connected to +input of comparator 20a and electrode 28 is connected to +input of comparator 20b. Output 29a of comparator 20a is connected to −input of comparator 20b and output 29b of comparator 20b is connected to −input of comparator 20a. Output 29a of comparator 20a is also connected to controller/ID generator 52. If capacitor 36a is larger than capacitor 36b so electrode 26 has a higher voltage (V26) than electrode 28 (V28) when signal is applied to electrode 38 V(38), then output 29a of comparator 20a goes to high logic level 1, and this signal is applied to −input of comparator 20b and to controller/ID generator 52. This high logic level 1 applied to −input comparator 20b ensures a low logic level 0 output for that comparator which is fed to the −input of comparator 20a. That low logic level 0 input ensures that output of comparator 20a stays at a high logic level 1 so the high logic level 1 signal continues to be applied to controller/ID generator 52 as long as interrogator 40 is providing power to power supply circuit 48 which supplies power for comparators 20a, 20b. This provides indication of when the capacitor 36a has a larger capacitance value than capacitor 36b. Controller/ID generator 52 can sample latch 80 at any time and append this single bit of information to an ID code which is transmitted back to interrogator 40, as described herein above.

Figure 6:
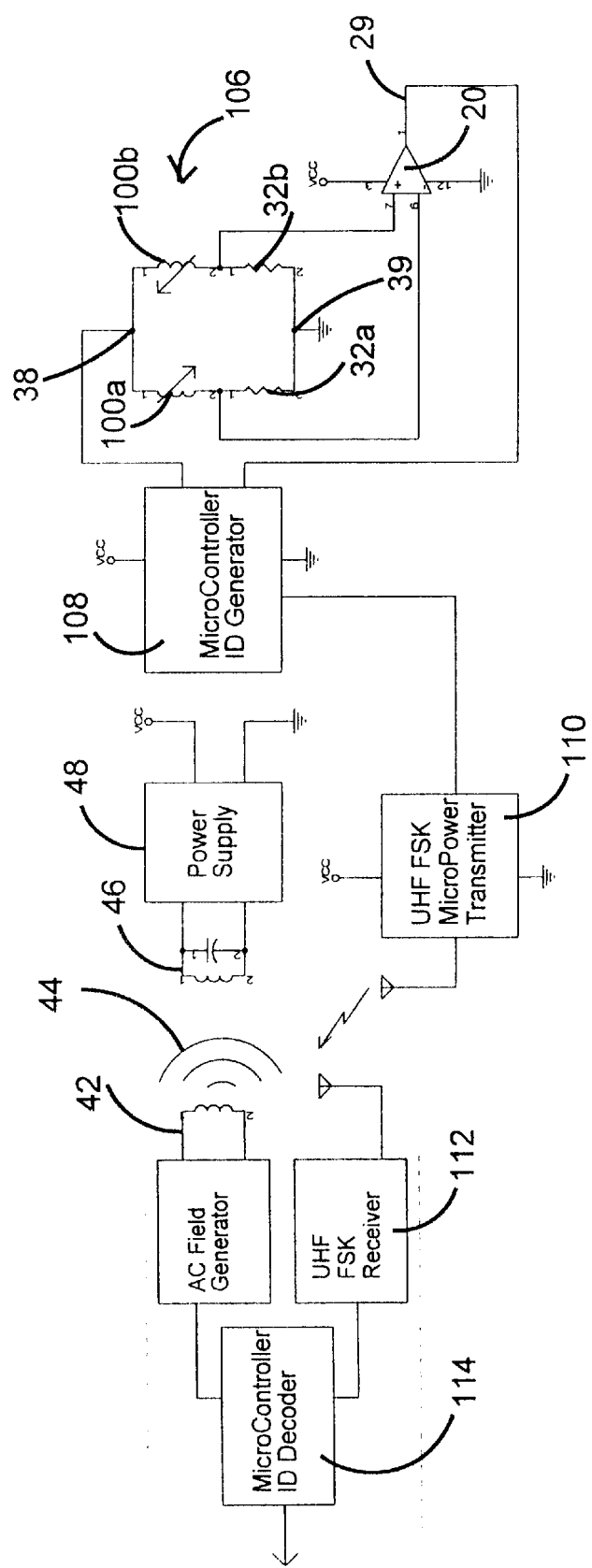
FIG. 6 is a block diagram of another embodiment of a sensing unit of the present invention including inductive sensors and showing additional variations in the invention.
Figure 7:
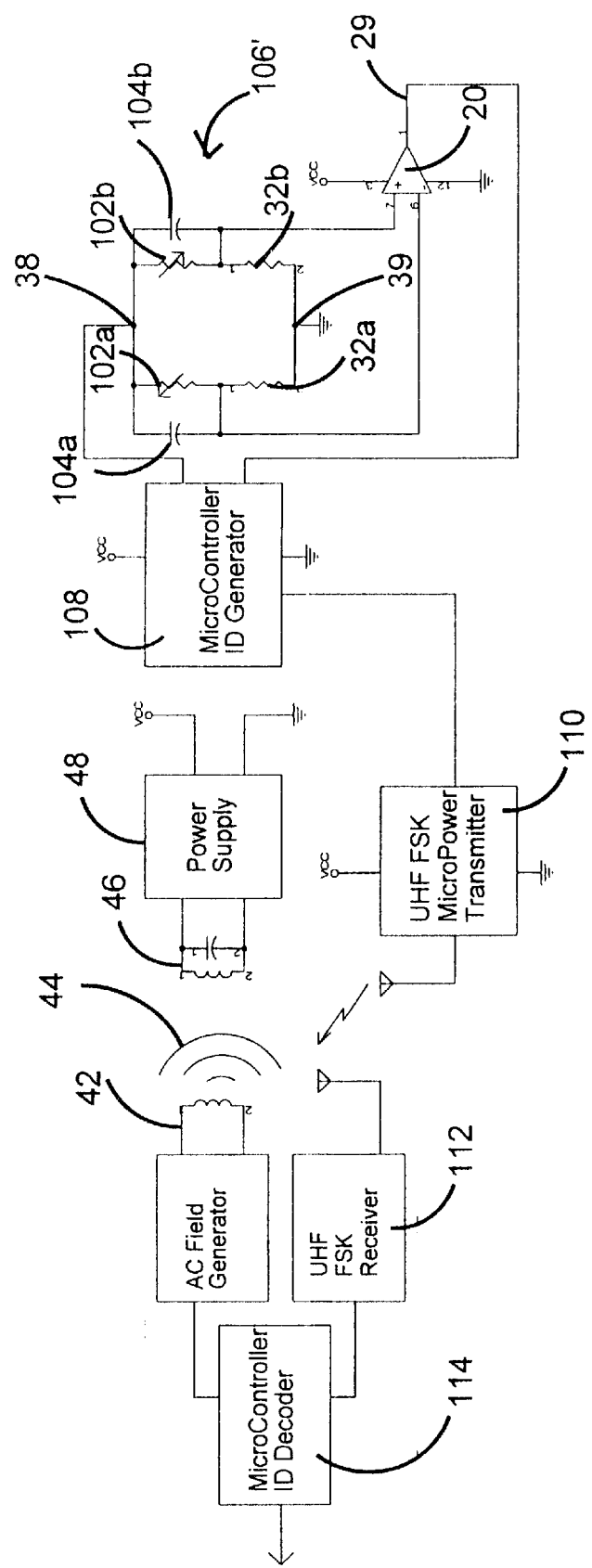
FIG. 7 is a block diagram of another embodiment of a sensing unit of the present invention including resistive sensors.

Capacitive sensors 36a, 36b shown in FIGS. 1, 3, 4 can be replaced with other types of sensors, such as variable inductive sensor 100a, 100b, as shown in FIG. 6, or variable resistive sensor 102, as shown in FIG. 7. U.S. patent application Ser. No. 09/259,615, incorporated herein by reference, describes a sensor having a differential inductive sensor that is capable of capturing the peak displacement and strain of the structure to which it is affixed without power. However, power is needed for interrogation, and the systems provided herein facilitate this with very low power required and with remote powering and communications.

Fixed capacitors 104a, 104b, matched in value, are used in parallel with each arm of variable resistive sensor 102 to facilitate the AC component of bridge unbalance. As in the embodiment with variable capacitors 36a, 36b, fixed matched bridge completion resistors 32a, 32b are used in Wheatstone bridge 106 with variable inductive sensors 100a, 100b. In another variation, illustrated in FIGS. 6 and 7, microcontroller 108 can directly apply excitation pulse to electrode 38, eliminating a separate excitation pulse generator. In another variation micropower RF transmitter 110 sends the ID and sensor information back to the interrogator that now comprises receiver 112 and microcontroller ID decoder 114. Both of these variations can also be applied in the variable capacitor embodiments shown in FIGS. 1, 4, and 5.

While several embodiments of the invention, together with modifications thereof, have been described in detail herein and illustrated in the accompanying drawings, it will be evident that various further modifications are possible without departing from the scope of the invention. Nothing in the above specification is intended to limit the invention more narrowly than the appended claims. The examples given are intended only to be illustrative rather than exclusive.

What is claimed is:

1. A method of using an electronic circuit, comprising the steps of:
    a) providing a circuit comprising a sensor, a circuit for reading said sensor, and a circuit for transmitting data;
    b) wirelessly providing power to each of said circuits from a remote source of power;
    c) sensing a change in a condition with said sensor;
    d) reading said sensor with said circuit for reading said sensor, wherein only a single pulse stimulation signal to said sensor is needed to read said sensor;
    e) providing said reading to a transmitting circuit; and
    f) transmitting said data with said transmitting circuit.

2. The method as recited in claim 1, wherein said reading depends on a time constant of a reactive element.

3. The method as recited in claim 1, further comprising the step of generating an ID for inclusion with said data.

4. The method as recited in claim 1, wherein in said sensing step (a) said sensor is for detecting a change in displacement, strain, speed, acceleration, temperature, pressure, or force.

5. The method as recited in claim 1, wherein in said providing step (a) said sensor comprises a differential sensor.

6. The method as recited in claim 5, wherein said differential sensor comprises a peak strain detection linear displacement sensor.

7. The method as recited in claim 5, wherein in said differential sensor comprises variable capacitors, variable inductors, or variable resistors.

8. The method as recited in claim 1, wherein in said providing step (a) said sensor can measure peak displacement or peak strain.

9. The method as recited in claim 1, wherein in said providing step (a) said circuits are implantable.

10. The method as recited in claim 1, wherein in said providing step (a) said circuit for reading said sensor comprises a comparator.

11. The method as recited in claim 10, wherein said circuit for reading said sensor comprises a pair of comparators.

12. The method as recited in claim 1, wherein in said sensing step (c) said condition comprises an environmental condition.

13. The method as recited in claim 1, wherein in said sensing step (c) said condition is a condition of a smart structure.

14. The method as recited in claim 1, wherein in said transmitting step (f) said data corresponds to peak displacement or peak strain.

15. The method as recited in claim 1, wherein in said transmitting step (f) said data comprises both direction and magnitude of change in said condition.

16. The method as recited in claim 1, wherein in said transmitting step (f) power for transmitting is provided from said remote source of power.

\* \* \* \* \*